US012810120B2

(12) United States Patent
Okur et al.

(10) Patent No.: US 12,810,120 B2
(45) Date of Patent: Nov. 24, 2026

(54) DEEP LEARNING BASED ANOMALY DETECTION SYSTEM FOR VIBRATION-BASED STRUCTURAL HEALTH MONITORING

(71) Applicants: KARADENIZ TEKNIK UNIVERSITESI TEKNOLOJI TRANSFERI UYGULAMA VE ARASTIRMA MERKEZI MUDURLUGU, Trabzon (TR); DYNAMIC ACADEMY YAZILIM İNŞAAT SANAYİ TİCARET LİMİTED ŞİRKETİ, Trabzon (TR)

(72) Inventors: Fatih Yesevi Okur, Trabzon (TR); Ahmet Can Altunişik, Trabzon (TR)

(73) Assignees: KARADENIZ TEKNIK UNIVERSITESI TEKNOLOJI TRANSFERI UYGULAMA VE ARASTIRMA MERKEZI MUDURLUGU, Trabzon (TR); DYNAMIC ACADEMY YAZILIM INSAAT SANAYI TICARET LIMITED SIRKETI, Trabzon (TR)

( * ) Notice: Subject to any disclaimer, the term of this patent is extended or adjusted under 35 U.S.C. 154(b) by 350 days.

(21) Appl. No.: 18/834,628

(22) PCT Filed: Mar. 4, 2024

(86) PCT No.: PCT/TR2024/050196
§ 371 (c)(1),
(2) Date: Jul. 31, 2024

(87) PCT Pub. No.: WO2024/215277
PCT Pub. Date: Oct. 17, 2024

(65) Prior Publication Data
US 2026/0178878 A1 Jun. 25, 2026

(30) Foreign Application Priority Data
Apr. 13, 2023 (TR) ................................ 2023/004089

(51) Int. Cl.
*G06N 3/045* (2023.01)
*G06N 3/04* (2023.01)
(Continued)

(52) U.S. Cl.
CPC ............... *G06N 3/045* (2023.01); *G06N 3/04* (2013.01); *G06N 3/049* (2013.01); *G06N 3/08* (2013.01);
(Continued)

(58) Field of Classification Search
None
See application file for complete search history.

(56) References Cited

U.S. PATENT DOCUMENTS 12,664,432 B1 * 6/2026 Kierat .................... G06N 3/063
2020/0151516 A1 * 5/2020 Anushiravani ...... A61B 5/0205
(Continued)

OTHER PUBLICATIONS

Komal Bajaj, et al., Autoencoders Based Deep Learner for Image Denoising, Procedia Computer Science, 2020, pp. 1535-1541, vol. 171.
(Continued)

*Primary Examiner* — Fekadeselassie Girma
(74) *Attorney, Agent, or Firm* — Bayramoglu Law Offices LLC

(57) ABSTRACT

A deep learning-based system for detecting anomalies in structures by means of signals obtained through vibration includes: a trained model obtained by using singular value signals of a model at different measurement times and an autoencoder formed by optimum parameters of an encoder and a decoder; where power spectrum matrices are created for each frequency step of signals coming from sensors, and
(Continued)

the singular value signals at different measurement times of a training model are given as input data in autoencoders as training data; and a detection model for classifying abnormal signal data if an error value between new data of a signal independent of the training model given as input to the trained model and reconstructed data obtained as output from the trained model is greater than an error threshold value, and classifies normally if not.

2 Claims, 1 Drawing Sheet

(51) Int. Cl.

| | |
|---|---|
| ***G06N 3/049*** | (2023.01) |
| ***G06N 3/08*** | (2023.01) |
| ***G06N 3/084*** | (2023.01) |
| ***G06N 3/088*** | (2023.01) |
| ***G06N 20/00*** | (2019.01) |

(52) U.S. Cl.
CPC ............ *G06N 3/084* (2013.01); *G06N 3/088* (2013.01); *G06N 20/00* (2019.01)

(56) References Cited

U.S. PATENT DOCUMENTS

| | | | | |
|---|---|---|---|---|
| 2021/0272704 | A1* | 9/2021 | Sudo | G06N 3/0442 |
| 2021/0325482 | A1* | 10/2021 | Setegn | A61B 5/243 |
| 2023/0260634 | A1* | 8/2023 | Banerjee | G16H 50/30 702/19 |
| 2025/0037734 | A1* | 1/2025 | Ramadas | G10L 25/27 |
| 2025/0093231 | A1* | 3/2025 | Mungara | G01M 7/00 |
| 2025/0252641 | A1* | 8/2025 | Wu | G06T 13/40 |

OTHER PUBLICATIONS

Yuequan Bao, etl al., Computer vision and deep learning-based data anomaly detection method for structural health monitoring, Structural Health Monitoring, 2019, pp. 401-421, vol. 18 No.2.

Zhiyi Tang, et al., Convolutional neural network-based data anomaly detection method using multiple information for structural health monitoring, Struct Control Health Monit., 2018, pp. 1-22.

Sourav Dutta, et al., Data-Driven Reduced Order Modeling of Environmental Hydrodynamics Using Deep Autoencoders and Neural Odes, IX International Conference on Computational Methods for Coupled Problems in Science and Engineering, 2021, pp. 1-16.

Shahsavari Vahid, et al., Detection of Structural Damage Under Varying Environmental Conditions, 10th International Conference on Short and Medium Span Bridges, 2018, pp. 1-31.

Johm Mark Go Payawal, et al., Image-Based Structural Health Monitoring: A Systematic Review, Applied Sciences, 2023, pp. 1-29, vol. 13 No. 968.

C. Rainieri, et al., Operational Modal Analysis: overview and applications, MEETING—Mitigation of the Earthquake Effects in Towns and in INdustrial reGional districts, pp. 29-43.

Julius S. Bendat, et al., Random Data Analysis and Measurement Procedures, A John Wiley Sons Inc., Publication, 2010, pp. 1-604.

Yuguang Fu, et al., Sensor fault management techniques for wireless smart sensor networks in structural health monitoring, Struct Control Health Monit., 2019, pp. 1-21, vol. 26.

Jianxiao Mao, et al., Toward data anomaly detection for automated structural health monitoring: Exploiting generative adversarial nets and autoencoders, Structural Health Monitoring, 2020, pp. 1-18.

* cited by examiner

DEEP LEARNING BASED ANOMALY DETECTION SYSTEM FOR VIBRATION-BASED STRUCTURAL HEALTH MONITORING

CROSS REFERENCE TO THE RELATED APPLICATIONS

This application is the national phase entry of International Application No. PCT/TR2024/050196, filed on Mar. 4, 2024, which is based upon and claims priority to Turkish Patent Application No. 2023/004089, filed on Apr. 13, 2023, the entire contents of which are incorporated herein by reference.

TECHNICAL FIELD

The invention relates to a deep learning-based system for detecting anomalies in structures by means of signals obtained through vibration.

BACKGROUND

Monitoring the structural behavior and structural health of engineering structures by non-destructive testing methods has become a very important issue in recent years. In these methods, signals from sensitive accelerometers placed on the structure are processed and dynamic characteristics (natural frequency, mode shape and damping ratio) representing the structural behavior are obtained and interpreted. While the changes in dynamic characteristics may indicate any damage that may occur on the structure, it is very important to consider the changes that may occur under environmental effects. In this way, the structural behavior of the structure under changing environmental conditions, which includes various uncertainties, can be determined, and the situation that makes the researchers' work difficult in the correct evaluation of the current condition of the structures will be eliminated.

Due to the issues described above, it is of great importance to detect data anomalies caused by changing environmental influences.

In recent years, many model-based methods have been developed for anomaly detection in engineering structures. In these methods, anomalies are detected by building statistical models and estimating appropriate threshold intervals. However, faced with large amounts of data due to long-term monitoring of structures, researchers have recently started to use machine learning and deep learning techniques for anomaly detection. The most important feature of these techniques is that they learn by correlating data without intervention and quickly scanning the data to identify features. Bao et al. (2019) proposed a computer vision and deep learning-based anomaly detection method in which raw time series obtained by camera sensor in building health monitoring are converted into vector and fed with deep neural networks to detect various anomalies. However, it was stated that the time series obtained with the camera sensor did not provide accurate results in rigid structures (Payawal and Kim, 2023). Fu et al. (2019) trained the power spectral densities of sensors with artificial neural networks to detect anomalies. Various suggestions are presented to eliminate the uncertainties in learning with artificial neural networks used in their study. Tang et al. (2019) proposed an algorithm for anomaly detection of real time series and fast fourier transforms using convolutional neural networks. In the study, they trained neural networks by visualizing time series measurements in the time and frequency domain as images and used them in classification for anomaly detection. In their study, it was emphasized that data sets trained with each sensor network may change the results. At the same time, the large data sets used for training were used as supervised learning and manual labeling was applied to the data sets. However, manual processing can lead to both time loss and inaccurate results due to the human factor. Autoencoders used in deep learning give successful results under signal noise (Bajaj et al., 2020). Mao et al. (2020) proposed a method for autoencoder-based anomaly detection with computer vision. In the study, it was stated that autoencoder-based anomaly detection can detect anomalies over images, but it is not sufficient for tracking large amounts of data.

SUMMARY

The invention relates to a deep learning-based system for detecting anomalies in structures by means of vibration signals. The aim of the invention is long-term structural health monitoring in engineering structures.

Another aim of the invention is to perform long-term structural condition monitoring based on environmental vibration, such as vibration and fatigue monitoring of industrial machinery, aerospace industry.

In the literature, deep learning methods have been widely used in recent years for anomaly detection in structures. One of the most efficient methods in deep learning under various signal noises is the autoencoder method. However, when there is a large amount of input data to the autoencoder, accurate results cannot be obtained.

In vibration-based structural health monitoring, the physical properties of structures can change according to environmental conditions, and this can affect dynamic behavior (Shahsavari, 2018). Frequency, mode shape and damping ratio of the structures can be obtained by processing the signals obtained by placing multi-channel sensors on the structures in frequency and/or time domain. The most common method used in the frequency domain for data processing is the Enhanced Frequency Domain Decomposition Method (EFDD). Using the raw signals from multi-channel sensors, a single signal output for all sensors can be obtained with the first singular values obtained by the EFDD method. This signal output also includes the frequencies of the structures, which is a holistic evaluation. Another aim of the invention is to use the changes in the single signal output obtained using the EFDD method for anomaly detection with the autoencoder method.

Another aim of the invention is to increase the efficiency of the autoencoder by reducing the amount of input data by reducing the large amount of data in multi-channel sensors to a single signal output.

Another aim of the invention is to enable automatic holistic assessment of the structure with a single signal output.

Figure 1:
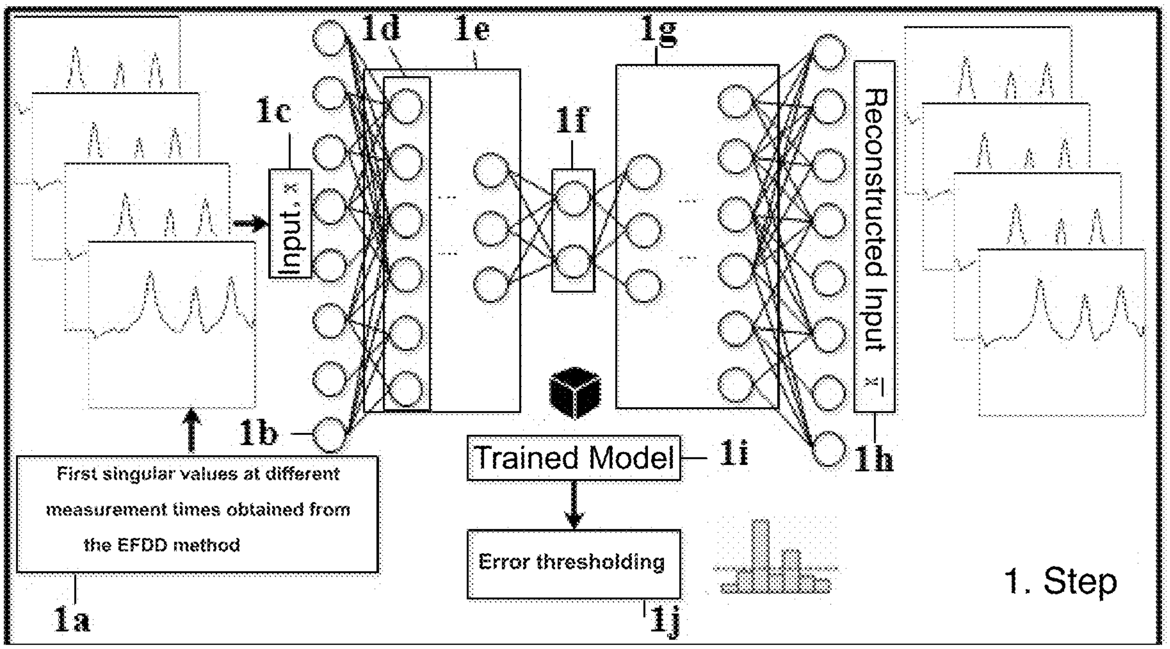
FIG. 1 shows a training model flow chart.
Figure 2:
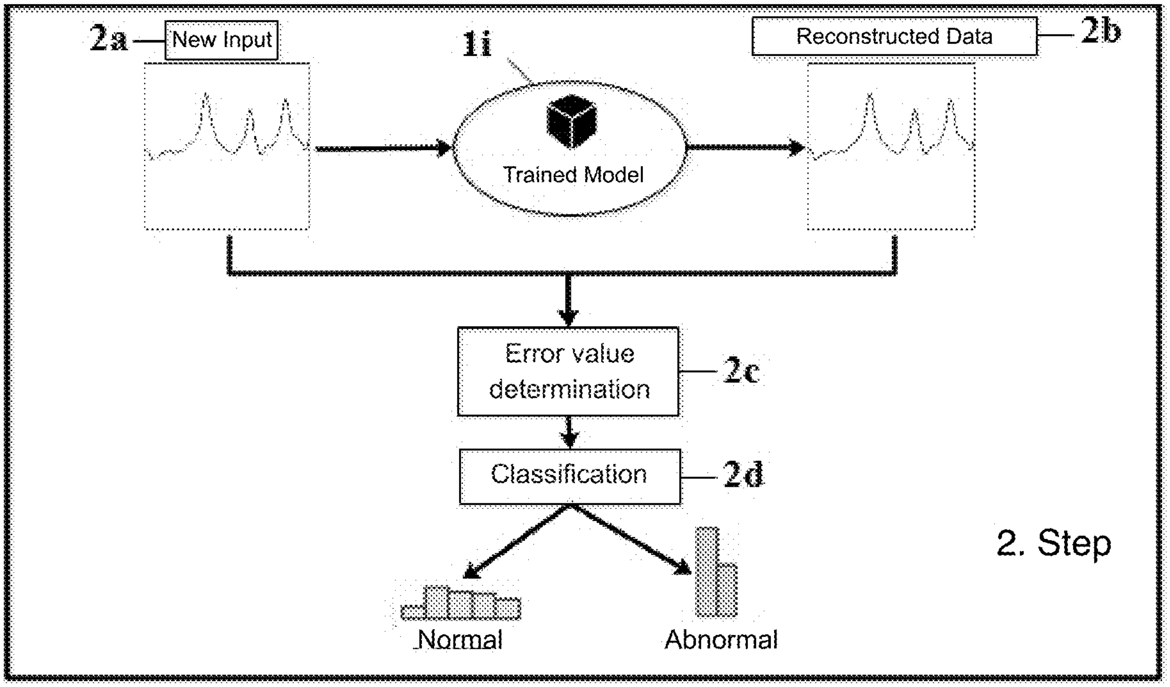
FIG. 2 shows a detection model flow chart.

1*a*. Obtaining first singular values according to EFDD Method

1*b*. Neuron

1*c*. Input vector

1*d*. Hidden layer

1*e*. Encoder

1f. Hidden node
1g. Decoder
1h. Reconstructed input vector
1i. Trained model
1j. Error thresholding
2a. New input data
2b. Reconstructed data
2c. Error value determination
2d. Classification

DETAILED DESCRIPTION OF THE EMBODIMENTS

The invention relates to a deep learning based system for detecting anomalies in structures by means of signals obtained through vibration by placing multi-channel sensors in the structures. System content: First singular value (1*a*) obtained according to the EFDD method, neuron (1*b*) providing information processing, input vector (1*c*) defining the data in the external environment as input vector, hidden layer (1*d*) transforming the values coming from the input vector (1*c*) by multiplying them with certain coefficients, encoder (1*e*) providing the function of reducing the size of the data in the input vector (1*c*), the hidden node (1*f*) which performs the function of storing the compressed data, the decoder (1*g*) which performs the function of increasing the data size of the compressed data, the reconstructed input vector (1*h*) which performs the function of storing the reconstructed input vector of the compressed data, trained model (1*i*), which performs the function of predicting the data in the new signal output according to the training data; error thresholding (1*j*), which determines the threshold values of the error amounts obtained according to the training data; new input data (2*a*), which is the input data of the signal output with another time independent of the training data, reconstructed data (2*b*), error value determination (2*c*) where the error value between the new input data and the reconstructed input data from the trained model is determined, and classification (2*d*) where the classification function is provided according to the obtained error amounts.

One of the most widely used methods in environmental vibration methods is the EFDD method. In this method, the spectral density function is generated by singular value decomposition of the power spectral matrix and the modes are obtained. In the EFDD method, the relationship between the unknown impact force and the known behavior function is defined as below (Bendat and Piersol, 2004):

$$G_{yy}(j\omega) = H(j\omega)^* G_{xx}(j\omega) H(j\omega)^T \quad (1.1)$$

$G_{xx}$(jw) is the Power Spectral Density (PSD) Function of the impulse signal, $G_{yy}$(jω) is the PSD Function of the response signal, H(jω) is the frequency behavior function, * is its complex conjugate and T is its transpose. By using the singular value decomposition method in the power density matrix of the response signal at each step (w=wi), $$G_{yy}(jw_i) = U_i S_i U_i^H \quad (1.2)$$

expression is obtained (Brincker et al., 2004; Rainieri and Fabbrocino, 2008). Here $u_{ij}$ is the singular vectors, $U_i=[u_{i1}, u_{i2}, \ldots, u_{im}]$ is the whole matrix containing singular vectors, $s_{ij}$ singular values and $S_i=[s_{i1}, s_{i2}, \ldots, s_{im}]$ denotes the diagonal matrix containing scalar singular values.

Power spectrum matrices are created for each frequency step of the signals from the sensors. The power spectrum matrices obtained for each frequency step are used in the Singular Value Decomposition Method to obtain the singular value signals (1*a*) of the training model at different measurement times. These values constitute the training data. Training data is defined as input data (1*c*) in autoencoders, one of the deep learning methods.

Autoencoders consist of three main parts: encoder (1*e*), decoder (1*g*) and hidden node (1*f*). Autoencoders work using artificial neural networks that mimic the functioning of the human brain. Similar to the human brain, artificial neural networks are composed of neurons (1*b*). The learning process takes place in neurons (1*b*). During learning, these networks have many hidden layers (1*d*) that are specified by the user. As the number of layers increases, the learning process becomes deeper. The part of the autoencoder from the input vector (1*c*) to the hidden node (1*f*) is referred to as the encoder (1*e*) section. Here, the hidden node obtained from the encoder (1*e*) considering the input data (1*c*) is defined as (Dutta et al., 2021):

$$z = h_E(x; \theta_E) \quad (1.3)$$

Here z is the hidden node vector, $h_e$ is the encoder (1*e*), x is the input vector (1*c*) and $\theta_E$ is the encoder (1*e*) parameters. Likewise, the section from the reconstructed input data (1*h*) to the hidden node (1*f*) is the decoder (1*g*). In this section, the reconstructed input vector (1*h*) is defined as (Dutta et al., 2021):

$$\bar{x} = h_D(z; \theta_D) \quad (1.4)$$

Here, $\bar{x}$ is the reconstructed input vector (1*h*), hp is the decoder (1*g*) parameters and $\theta_D$ is the decoder (1*g*) parameters. When training autoencoders, the encoder and decoder (1*g*) parameters $\theta_E$ and $\theta_D$ are minimized and, $$\theta_E^*, \theta_D^* = \min_{\theta_E, \theta_D} L(x, \bar{x}) \quad (1.5)$$

equation is obtained (Dutta et al., 2021). L(x,$\bar{x}$) Here, is the difference between the encoder (1*e*) and decoder (1*g*) vectors, $$\theta_E^*, \theta_D^*$$

denote the optimum encoder (1*e*) and decoder (1*g*) parameters, respectively. The autoencoder model is created with the obtained optimal encoder and decoder parameters. The trained model (1*i*) is created using the singular value signals of the training model at different measurement times. Using the trained model and the error values in the training model, the error threshold value within the 95% confidence interval is determined (1*j*).

In order to detect the anomaly, new data (2*a*) of the signal independent of the training model is given as input to the trained model (1*i*) and reconstructed data (2*b*) is obtained as output from the trained model. The error value between the new data (2*a*) and the reconstructed data (2*b*) is obtained (2*c*). If the error value (2*c*) is greater than the error threshold value (2*c*), the signal data is classified as abnormal, if not, the signal data is classified as normal (2*d*) and the abnormalities in the building signals are detected by the detection model.

What is claimed is:

1. A deep learning-based anomaly detection system for vibration-based structural health monitoring, comprising:

a trained model obtained by using singular value signals of a model at different measurement times and an autoencoder formed by optimum parameters of an encoder and a decoder; wherein power spectrum matrices are created for each frequency step of signals coming from sensors, and the singular value signals at different measurement times of a training model obtained by using a Singular Value Decomposition Method of the power spectrum matrices obtained for each frequency step are given as input data in autoencoders as training data; reconstructed input data obtained after a hidden node obtained from the encoder by taking the input data into consideration is minimized through the decoder, a detection model for classifying abnormal signal data if an error value between new data of a signal independent of the training model given as input to the trained model and reconstructed data obtained as output from the trained model is greater than an error threshold value, and classifies normally if not.

2. A method of operation of the deep learning-based anomaly detection system according to claim 1, comprising:

creating power spectrum matrices for each frequency step of the signals from the sensors, obtaining the singular value signals that constitute the training data of the training model at different measurement times from the power spectrum matrices obtained for each frequency step by using the Singular Value Decomposition Method, defining the training data as input data in the autoencoders, which is one of deep learning methods, obtaining the reconstructed input data after the hidden node obtained from the encoder considering the input data, generating the trained model using the singular value signals at different measurement times of the autoencoder model, which is constructed by obtaining the optimum parameters of the encoder and the decoder by minimizing the reconstructed input data through the decoder, giving new data of an independent signal as input to the trained model, obtaining the reconstructed data as output from the trained model, obtaining the error value between the new data and the reconstructed data, and classifying signal data as abnormal if the error value is greater than the error threshold value, and classifying as normal if not.

* * * * *